United States Patent
Chen

(10) Patent No.: US 10,708,057 B2
(45) Date of Patent: Jul. 7, 2020

(54) CONTROL SYSTEM BASED ON DYNAMIC PASSWORD AND USBKEY, AND CONTROL METHOD THEREOF

(71) Applicant: SHENZHEN EXCELSECU DATA TECHNOLOGY CO., LTD., Shenzhen, Guangdong (CN)

(72) Inventor: Liuzhang Chen, Guangdong (CN)

(73) Assignee: Shenzhen Excelsecu Data Technology Co., LTD, Shenzhen, Guangdong (CN)

(*) Notice: Subject to any disclaimer, the term of this patent is extended or adjusted under 35 U.S.C. 154(b) by 212 days.

(21) Appl. No.: 15/747,989

(22) PCT Filed: Dec. 9, 2015

(86) PCT No.: PCT/CN2015/096843
§ 371 (c)(1),
(2) Date: Jan. 26, 2018

(87) PCT Pub. No.: WO2017/016131
PCT Pub. Date: Feb. 2, 2017

(65) Prior Publication Data
US 2018/0234243 A1 Aug. 16, 2018

(30) Foreign Application Priority Data
Jul. 28, 2015 (CN) .......................... 2015 1 0452502

(51) Int. Cl.
*H04L 9/32* (2006.01)
*G06F 21/31* (2013.01)
(Continued)

(52) U.S. Cl.
CPC .......... *H04L 9/3226* (2013.01); *G06F 13/382* (2013.01); *G06F 21/31* (2013.01);
(Continued)

(58) Field of Classification Search
CPC ........ G06F 13/382; G06F 21/81; G06F 1/266; G06F 2213/0042; G06F 21/31; Y02D 10/14; Y02D 10/151
(Continued)

(56) References Cited

U.S. PATENT DOCUMENTS

2010/0082893 A1* 4/2010 Ma .................. G06F 12/0246
711/103

FOREIGN PATENT DOCUMENTS

CN 103595532 2/2014
CN 203466831 3/2014
(Continued)

OTHER PUBLICATIONS

International Search Report filed in PCT/CN2015/096843 dated Apr. 27, 2016.

*Primary Examiner* — Brandon S Hoffman
*Assistant Examiner* — Nega Woldemariam
(74) *Attorney, Agent, or Firm* — Rankin Hill & Clark LLP

(57) ABSTRACT

A control system based on dynamic password and USBKEY including a dynamic password control chip, a USB control chip, a USB interface, a battery, and a detection circuit. The detection circuit is configured to output a detection signal to the dynamic password control chip when it is detected that the USB interface is connected with an external device; the dynamic password control chip is configured to enter a sleep mode when receiving a detection signal; the battery is configured to supply power to the dynamic password control chip and to reduce the power supplied to the dynamic password control chip when the dynamic password control chip enters the sleep mode.

12 Claims, 4 Drawing Sheets

(51) Int. Cl.
*G06F 13/38* (2006.01)
*G06F 21/81* (2013.01)
*G06F 1/26* (2006.01)

(52) U.S. Cl.
CPC .............. *G06F 21/81* (2013.01); *G06F 1/266* (2013.01); *G06F 2213/0042* (2013.01); *Y02D 10/14* (2018.01); *Y02D 10/151* (2018.01)

(58) Field of Classification Search
USPC ........................................................... 726/7
See application file for complete search history.

(56) References Cited

FOREIGN PATENT DOCUMENTS

| CN | 104038345 | 9/2014 |
| CN | 105005727 | 10/2015 |
| CN | 204926090 | 12/2015 |

\* cited by examiner

CONTROL SYSTEM BASED ON DYNAMIC PASSWORD AND USBKEY, AND CONTROL METHOD THEREOF

TECHNICAL FIELD

The present application relates to the technical field of data transaction, more particularly to a control system based on dynamic password and USBKEY, and a control method thereof.

BACKGROUND

OTP means One-time password, also called dynamic password, it is a time-dependent and unpredictable random digital combination generated according to special algorithm in every 60 seconds. Each password can only be used once. OTP can be technically divided into three types, that is, time synchronization, event synchronization, and challenge/response, of which, the challenge/response OTP is typically used in online business, a challenge code is output from a server terminal to a website/response, and the challenge code is input into a dynamic token, and a 6/8-bit random digits is generated by an internal algorithm, the password is available for once, and because it is required to input the challenge code, a digital keyboard is required.

For a composite device possessing both the OTP function and the USBKEY function in the prior art, an OTP control chip is used to control a display and keys. When using a USB interface, an USB control chip communicates with the OTP control chip via an additional communication port and transmits contents to be displayed to the OTP control chip for displaying by the displayer, and key press information is transmitted to the USB control chip via the OTP control chip. When using the USB mode, the OTP control chip communicates with the USB control chip, the OTP control chip needs to operate at relatively high speed, and there are two power supply methods in the prior art, one method is to use a battery of the OTP control chip to supply power, in this way, the power of the battery of the OTP control chip will be consumed in the USB mode, in order to ensure enough service time in the OTP mode, the capacity of the battery is required to be increased, thereby increasing the cost of the battery, moreover, once a device is connected with the USB interface for a long period, the battery may be depleted; the other method is to automatically switch to an USB interface for power supply in the USB mode, the method requires complicate switching circuit, moreover, voltage instability of the USB interface may induce reset of the OTP control chip, thereby making the OTP function ineffective. Both the two methods frequently start the OTP control chip when using the USB interface function, and when communication error occurs, the abnormal operation of the OTP control chip may be caused, which makes the OTP mode unavailable, and if the OTP control chip operates abnormally, the USB mode may also be unable to operate. In summary, there are problems in the prior art that when using the USB mode and switching to the USB interface for power supply, the instability of the power supply by the USB interface may make the OTP control chip lose the preset contents and require increase of the capacity of the battery.

SUMMARY

It is an object of the present application to provide a control system based on dynamic password and USBKEY and a control method thereof, which aims to solving the problems in the prior that when using the USB mode and switching to the USB interface for power supply, the instability of the power supply by the USB interface may lose the preset contents and the capacity of the battery needs to be increased.

The present application is implemented as follows: a first aspect provides a control system based on dynamic password and USBKEY. The control system comprises a dynamic password control chip, a USB control chip, a USB interface, a battery, and a detection circuit;

an input terminal of the detection circuit is connected with the USB interface, a first output terminal of the detection circuit is connected with a state detection terminal of the dynamic password control chip, and the detection circuit is configured to output a detection signal to the dynamic password control chip when it is detected that the USB interface is connected with an external device;

the dynamic password control chip is configured to enter a sleep mode when the detection signal is received;

the battery is connected with a power input terminal of the dynamic password control chip, and the battery supplies power to the dynamic password control chip; and an input/output terminal of the USB control chip is connected with the USB interface, and the USB control chip is configured to interactively communicate with the external device via the USB interface.

In combination with the first aspect, in a first possible implementation manner of the first aspect, the control system further comprises a keyboard circuit;

the keyboard circuit comprises multiple keys, multiple first signal lines, and multiple second signal lines; the multiple first signal lines and the multiple second signal lines are crosswisely arranged, each of the multiple keys is connected with one of the multiple first signal lines and one of the multiple second signal lines, the multiple first signal lines and the multiple second signal lines are connected with multiple input terminals of the dynamic password control chip, and at least one of the multiple second signal lines is connected with an input terminal of the USB control chip; and a second output terminal of the detection circuit is connected with one of the multiple first signal lines of the keyboard circuit, and the detection circuit is configured to adjust a level state of the one of the multiple first signal lines connected therewith when the USB interface is connected with the external device, whereby allowing the USB control chip to receive a key press information from the keyboard.

In combination with the first possible implementation manner of the first aspect, in the second possible implementation manner of the first aspect, the dynamic password control chip is further configured to scan the keys when it is detected that the USB interface is not connected with the external device, and to enter into the sleep mode when a shutdown signal is received or when a scanning time exceeds a preset value.

In combination with the first aspect, in a third possible implementation manner of the first aspect, the detection circuit comprises a first resistor, a second resistor, and a switch tube;

a first terminal of the first resistor is connected with a power terminal of the USB interface, a second terminal of the first resistor is connected with a first terminal of the second resistor and a control terminal of the switch tube, a second terminal of the second resistor and an input terminal of the switch tube are in common grounding, and the control terminal of the switch tube acts as the first output terminal of the detection circuit, and an output terminal of the switch tube acts as the second output terminal of the detection circuit.

In combination with the second possible implementation manner of the first aspect, in a fourth possible implementation manner of the first aspect, an isolation circuit is arranged between the USB control chip and the keyboard circuit; the isolation circuit comprises a unidirectional conduction device and a pull-up resistor, an input terminal of the unidirectional conduction device is connected with a first terminal of the pull-up resistor, an output terminal of the unidirectional conduction device forms one output terminal of the isolation circuit, a first terminal of each pull-up resistor is connected with one corresponding input terminal of the USB control chip, and a second terminal of each pull-up resistor is connected with a direct current power supply.

In combination with the first aspect, in a fifth possible implementation manner of the first aspect, the control system further comprises a display, and an output terminal of the dynamic password control chip and an output terminal of the USB control chip are connected with an input terminal of the display;

the dynamic password control chip is configured to stop control of the display and enter into the sleep mode when it is detected that the USB interface is in connection with the external device; and the USB control chip is configured to control the display when the USB interface is connected with the external device.

In combination with the first aspect, in a sixth possible implementation manner of the first aspect, an isolation resistor is arranged between each output terminal of the USB control chip and each input terminal of the display.

A second aspect of the present application provides a control method of the control system based on the dynamic password and the USBKEY, and the control method comprises:

outputting the detection signal by the detection circuit to the dynamic password control chip when it is detected that the USB interface is in connection with the external device;

allowing the dynamic password control chip to enter into the sleep mode when the detection signal is received;

supplying power by the battery to the dynamic password control chip; and allowing the USB control chip to interactively communicate with the external device via the USB interface.

In combination with the second aspect, in a first possible implementation manner of the second aspect, the control method further comprises the following steps:

scanning the keys by the dynamic password control chip when it is detected that the USB interface is not connected with the external device, and allowing the dynamic password control chip to enter into the sleep mode when a shutdown signal is received or when a scanning time exceeds a preset value.

In combination with the second aspect, in a second possible implementation manner of the second aspect, the control method further comprises the following steps:

stopping driving the display and entering the sleep mode by the dynamic password control chip when it is detected that the USB interface is in connection with the external device; and controlling the display by the USB control chip when the USB interface is connected with the external device.

In the control system based on the dynamic password and the USBKEY and the control method thereof provided by the present application, by arranging the detection circuit, when the dynamic password control chip is in an operating state, the dynamic password chip is supplied with power by the battery, when the detection circuit detects that the USB interface is connected with the external device, the USB control chip starts to work and the dynamic password control chip automatically enters the sleep mode, and the dynamic password control chip is still supplied with power by the battery. Because the dynamic password control chip enters a low power consumption state, the power supplied by the battery can be saved, and power supply to the dynamic password control chip and the power supply to the USB control chip are not interfered with each other, such that the defects in the prior are avoided that during connection between the USB interface and the external device, the dynamic password control chip switches to the USB power supply mode and therefore may lose the preset contents. The independent power supplies to the dynamic password control chip and to the USB control chip are realized, no communication between the USB control chip and the dynamic password control chip is required, and the codes amount and the debugging work are reduced.

BRIEF DESCRIPTION OF THE DRAWINGS

In order to more clearly illustrate the technical solution in embodiments of the present application, the following drawings, which are to be used in the description of the embodiments or the prior art, will be briefly described. It will be apparent that the drawings described in the following description are merely embodiments of the present application. Other drawings may be obtained by those skilled in the art without paying creative labor.

DETAILED DESCRIPTION OF THE EMBODIMENTS

In order to make the purposes, the technical solutions, and advantages of the present application more clear, the present application will be further described in detail with reference to the accompanying drawings and embodiments. It should be understood that the embodiments described herein are only used to explain the present application but are not intended to limit the present application.

In order to describe the technical solution of the present application, detailed embodiments are described below.

Figure 1:
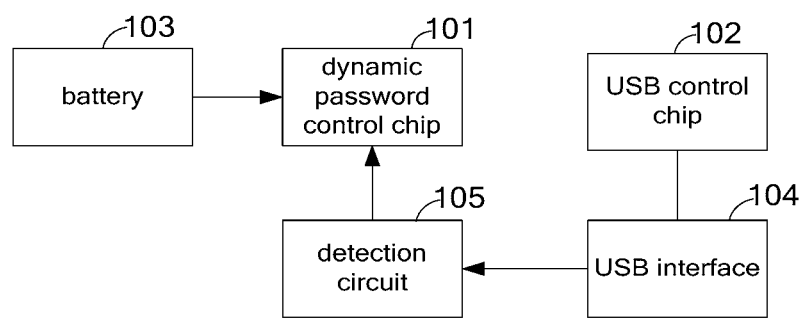
FIG. 1 is a structural diagram of a control system based on dynamic password and USBKEY provided by one embodiment of the present application.

A control system based on dynamic password and USB-KEY is provided by one embodiment of the present application, as shown in FIG. 1, the control system comprises a dynamic password control chip 101, a USB control chip 102, a USB interface 104, a battery 103, and a detection circuit 105.

An input terminal of the detection circuit 105 is connected with the USB interface 104, a first output terminal of the detection circuit 105 is connected with a state detection terminal of the dynamic password control chip 101, and the detection circuit 105 is configured to output a detection signal to the dynamic password control chip 101 when it is detected that the USB interface 104 is connected with an external device.

The dynamic password control chip 101 is configured to enter a sleep mode when the detection signal is received.

The battery 103 is connected with a power input terminal of the dynamic password control chip 101, the battery 103 supplies power to the dynamic password control chip 101, and the battery 103 reduces the power supplied to the dynamic password control chip 101 when the dynamic password control chip 101 enters the sleep mode.

An input/output terminal of the USB control chip 102 is connected with the USB interface 104, and the USB control chip 102 is configured to interactively communicates with the external device via the USB interface 104.

By arranging the detection circuit 105 in this embodiment of the present application, when the dynamic password control chip 101 is in an operating state, the dynamic password control chip is supplied with power by the battery 103. When the detection circuit 105 detects that the USB interface 104 is connected with the external device, the USB control chip 102 starts to work, the dynamic password control chip 101 automatically enters the sleep mode, and the dynamic password control chip 101 is stilled supplied with power by the battery 103. Because the dynamic password control chip 101 enters a state of low power consumption, the power supply from the battery 103 can be saved, and power supply to the dynamic password control chip 101 and the power supply to the USB control chip 102 are not interfered with each other, such that the defects in the prior are avoided that during connection between the USB interface and the external device, the dynamic password control chip 101 switches to the USB power supply mode and therefore may lose the preset contents. The independent power supplies to the dynamic password control chip 101 and to the USB control chip 102 are realized, no communication between the USB control chip 102 and the dynamic password control chip 101 is required, and the codes amount and the debugging work are reduced.

Figure 2:
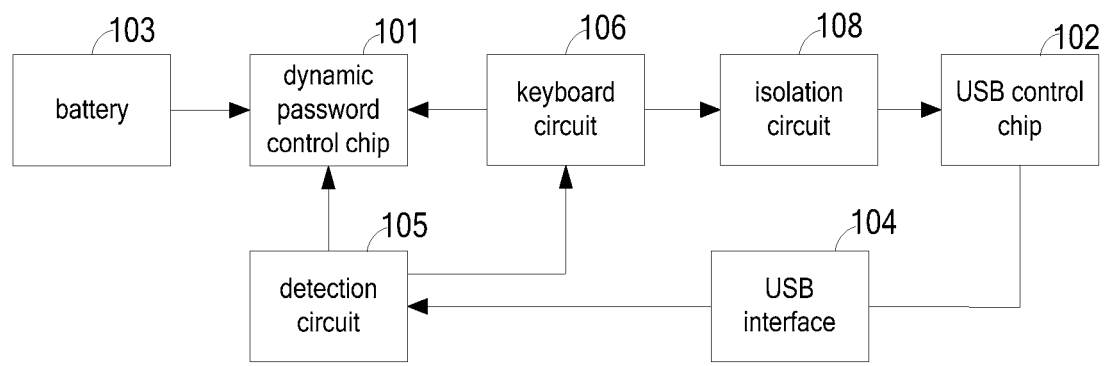
FIG. 2 is a structural diagram of a control system based on dynamic password and USBKEY provided by another embodiment of the present application.

The control system based on the dynamic password and the USBKEY is provided by another embodiment of the present application. As shown in FIG. 2, the control system further comprises a keyboard circuit 106; the keyboard circuit 106 comprises multiple keys, multiple first signal lines, and multiple second signal lines. The multiple first signal lines and the multiple second signal lines are crosswisely arranged, and each of the multiple keys is connected with one of the multiple first signal lines and one of the multiple second signal lines. The multiple first signal lines and the multiple second signal lines are connected with multiple input terminals of the dynamic password control chip 101, and at least one of the multiple second signal lines is connected with an input terminal of the USB control chip 102.

A second output terminal of the detection circuit 105 is connected with one of the multiple first signal lines of the keyboard circuit 106, and the detection circuit 105 is configured to adjust a level state of the one of the multiple first signal lines connected therewith when the USB interface 104 is connected with the external device, whereby allowing the USB control chip 102 to receive a key press information from the keyboard.

Specifically, the detection circuit comprises a first resistor R1, a second resistor R2, and a switch tube; a first terminal of the first resistor R1 is connected with a power terminal of the USB interface 104, a second terminal of the first resistor R1 is connected with a first terminal of the second resistor R2 and a control terminal of the switch tube, a second terminal of the second resistor R2 and an input terminal of the switch tube are in common grounding, and the control terminal of the switch tube acts as the first output terminal of the detection circuit 105, and an output terminal of the switch tube acts as the second output terminal of the detection circuit 105.

Specifically, the switch tube can be a switching device such as a field effect transistor, a triode, and an IGBT.

Preferably, the switch tube can be the field effect transistor Q1, and a drain, a source, and a gate of the field effect transistor Q1 are the output terminal, the input terminal, and the control terminal of the switch tube, respectively.

Alternatively, an isolation circuit 108 is arranged between the USB control chip 102 and the second signal lines connected therewith; the isolation circuit 108 comprises a unidirectional conduction device and a pull-up resistor, an input terminal of the unidirectional conduction device is connected with a first terminal of the pull-up resistor, an output terminal of the unidirectional conduction device forms one output terminal of the isolation circuit, a first terminal of each pull-up resistor is connected with one corresponding input terminal of the USB control chip 102, and a second terminal of each pull-up resistor is connected with a direct current power supply.

Specifically, the unidirectional conduction device is a device with unidirectional conduction, such as a diode.

Preferably, the unidirectional conduction device is the diode.

Figure 3:
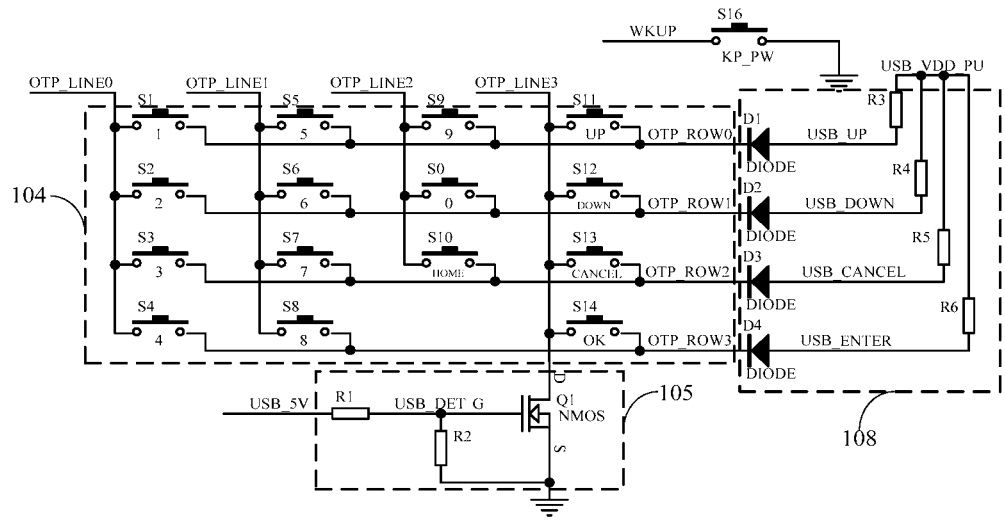
FIG. 3 is a circuit diagram including a keyboard circuit, an isolation circuit, and a detection circuit of the control system based on the dynamic password and the USBKEY provided by another embodiment of the present application.

As shown in FIG. 3, the keyboard circuit 106 comprises 16 keys, which comprise four first signal lines and four second signal lines that are crosswisely arranged, of them, pins of the first signal lines are OTP_LINE0, OTP_LINE1, OTP_LINE2, and OTP_LINE3, and pins of the second signal lines are OTP_ROW0, OTP_ROW1, OTP_ROW2, and OTP_ROW3, the pins of the first signal lines and the pins of the second signal lines are connected with array scanning pins arrays of the OTP control chip, and the pins of the second signal lines are respectively connected with the USB control chip 102 via the isolation circuit 108. A pin OTP_ROW0 of the second signal lines is connected with a cathode of a first diode D1, and an anode of the first diode D1 is connected with a first terminal of a third resistor R3, and a second terminal of the third resistor R3 is connected with a scroll-up key USB_UP of the USB control chip 102. A pin OTP_ROW1 of the second signal lines is connected with a cathode of a second diode D2, and an anode of the second diode D2 is connected with a first terminal of a fourth resistor R4, and a second terminal of the fourth resistor R4 is connected with a scroll-down key USB_DOWN of the USB control chip 102. A pin OTP_ROW2 of the second signal lines is connected with a cathode of a third diode D3, and an anode of the third diode D3 is connected with a first terminal of a fifth resistor R5, and a second terminal of the fifth resistor R5 is connected with a cancel key USB_CANCEL of the USB control chip 102. A pin OTP_ROW3 of the second signal lines is connected with a cathode of a fourth diode D4, and an anode of the fourth diode D4 is connected with a first terminal of a sixth resistor R6, and a second terminal of the sixth resistor R6 is connected with an enter key USB_ENTER of the USB control chip 102. An USB_5V of the detection circuit 105 is a power supply signal connected with the USB interface 104, and a first field effect transistor Q1 is an NMOS transistor, an USB_DET is connected with the state detection terminal of the OTP control chip for detecting the USB interface 104, when the OTP mode is used, the USB control chip 102 is in a power off state, the diodes D1-D4 do not allow the current to flow to the USB control chip 102, and the gate of the field effect transistor Q1 is at low level, thus, the current will not flow to the field effect transistor Q1 and the OTP control chip can realize the array scanning. When the USB interface is connected, the USB_5V is at a high level state, the OTP control chip exists the OTP mode when detecting a high level of the USB_DET and enters the sleep mode, the gate of the field effect transistor Q1 is at high level, the current flows to the source of the Q1, which equivalents to that the pin OTP_LINE3 is grounded, in such condition, pins of the four keys USB_UP, USB_DOWN, USB_CANCEL, and USB_ENTER are pulled up via the isolation resistors R3-R6, when any of the keys S11-S14 is pressed down, it can be detected by any of the keys USB_UP, USB_DOWN, USB_CANCEL, USB_ENTER that the level is changed from high to low, thereby accomplishing the key press detection.

Further, the dynamic password control chip 101 is further configured to scan keys when it is detected that the USB interface 104 is not connected with the external device, and to enter into the sleep mode when a shutdown signal is received or when a scanning time exceeds a preset value.

Figure 4:
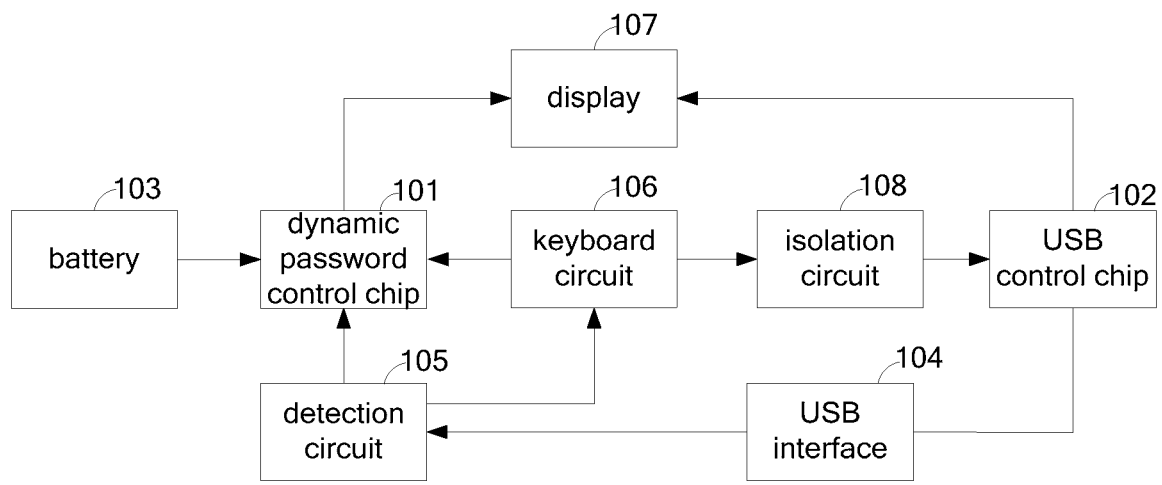
FIG. 4 is a structural diagram of a control system based on dynamic password and USBKEY provided by still another embodiment of the present application.

The control system based on the dynamic password and the USBKEY is provided by a third embodiment of the present application, as shown in FIG. 4, the control system further comprises a display 107, and an output terminal of the dynamic password control chip 101 and an output terminal of the USB control chip 102 are connected with an input terminal of the display 107; and the dynamic password control chip 101 is configured to stop control of the display 107 and enter into the sleep mode when it is detected that the USB interface 104 is connected with the external device; and the USB control chip 102 is configured to control the display when the USB interface is connected with the external device.

Further, an isolation resistor is arranged between each output terminal of the USB control chip 102 and each input terminal of the display 107.

Figure 5:
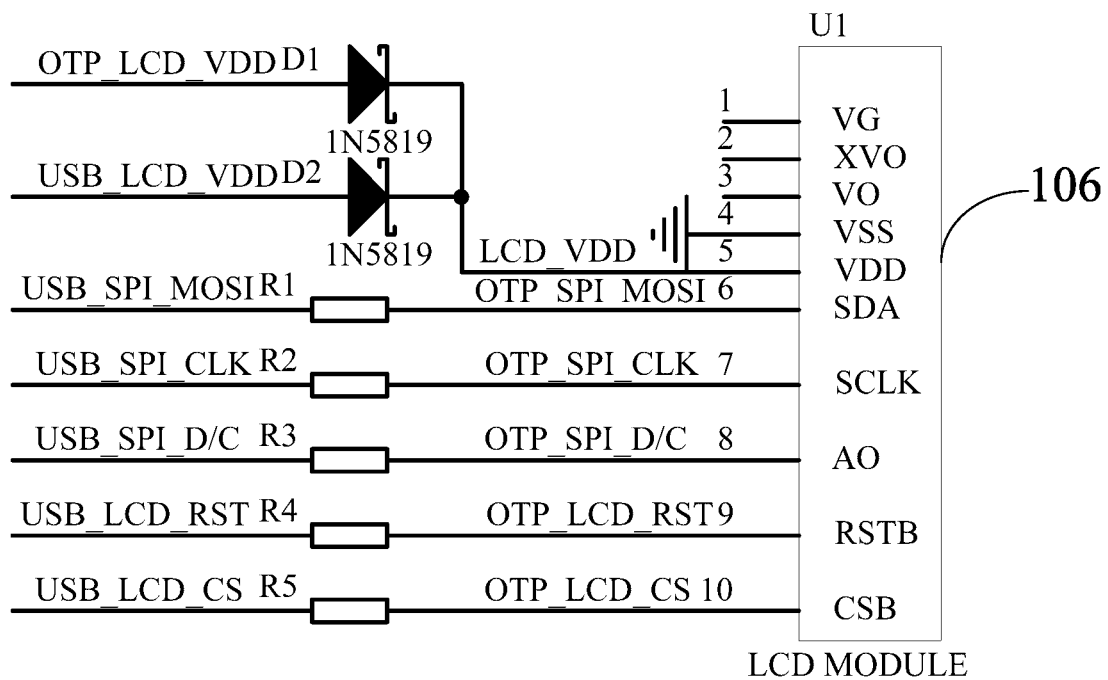
FIG. 5 is a circuit diagram of a display of the control system based on the dynamic password and the USBKEY provided by still another embodiment of the present application.

As shown in FIG. 5, The OTP control chip is connected with a communication pin of the display 107, the USB control chip is connected with a data pin of the display 107 via a resistor connected in series. During the OTP mode, the OTP control chip supplies power to the display 107 via an OTP_LCD_VDD, the USB control chip is in a power off state, a connection pin of the OTP control chip with the display 107 is equivalent to increase of the pull-down resistor and can still keep normal communication with the display 107. During the USB mode, the OTP control chip detects a USB connection via the USB_DET pin, sets the pin controlling the display 107 to be an input state, and enters the sleep mode, waiting a next restart of the OTP mode.

Figure 6:
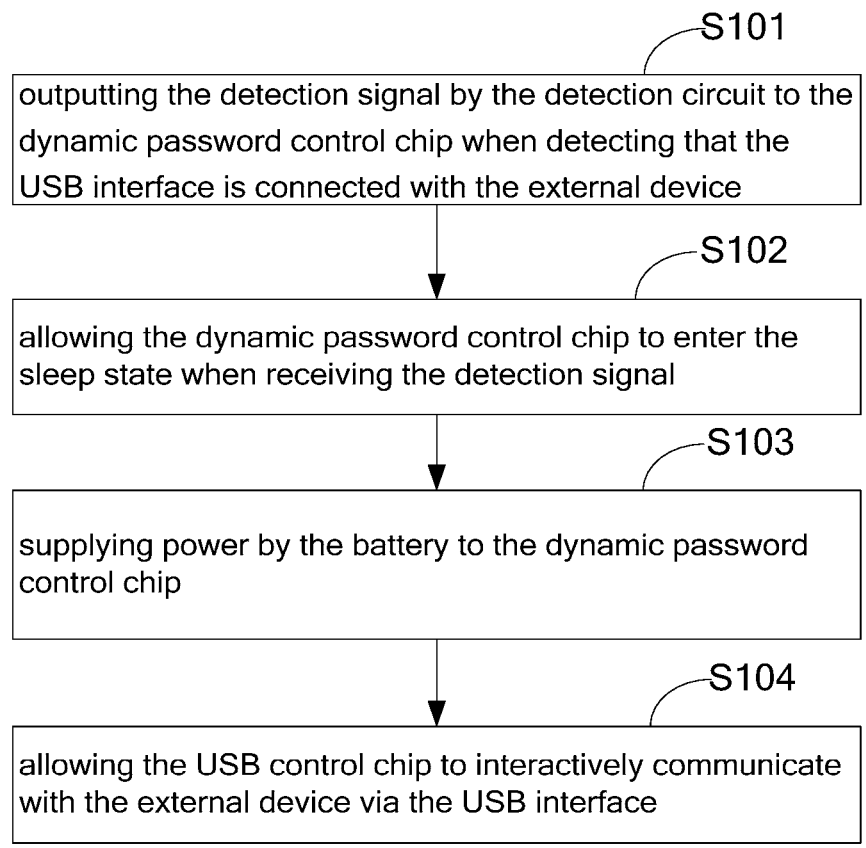
FIG. 6 is a flow chart of a control method based on dynamic password and USBKEY provided by one embodiment of the present application.

A control method of the control system based on the dynamic password and the USBKEY is provided by still another embodiment of the present application, as shown in FIG. 6, the control method comprises:

S101: outputting the detection signal by the detection circuit 105 to the dynamic password control chip 101 by the detection circuit 105 when detecting that the USB interface 104 is connected with the external device;

S102: allowing the dynamic password control chip 101 to enter into the sleep mode when the detection signal is received;

S103: supplying power by the battery 103 to the dynamic password control chip 101, and reducing the power supplied to the dynamic password control chip 101 when the dynamic password control chip 101 enters the sleep mode; and S104: allowing the USB control chip 102 to interactively communicate with the external device via the USB interface 104.

Alternatively, the dynamic password control chip 101 is further configured to scan keys when it is detected that the USB interface is not connected with the external device, and to enter into the sleep mode when a shutdown signal is received or when a scanning time exceeds a preset value.

Alternatively, when it is detected that the USB interface 104 is connected with the external device, the dynamic password control chip 101 stops driving the display 107 to enable the USB control chip 102 to control the display 107, and enters the sleep mode; and the USB control chip controls the display when the USB interface is connected with the external device.

In the control system based on the dynamic password and the USBKEY and the control method thereof provided by the present application, by arranging the detection circuit, when the dynamic password control chip is in an operating state, the dynamic password control chip is supplied with power by the battery. When the detection circuit detects that the USB interface is connected with the external device, the USB control chip starts to work, the dynamic password control chip automatically enters the sleep mode, and the dynamic password control chip is stilled supplied with power by the battery. Because the dynamic password control chip enters the state of low power consumption, the power supply from the battery can be saved, and power supply to the dynamic password control chip and the power supply to the USB control chip are not interfered with each other, such that the defects in the prior are avoided that during connection between the USB interface and the external device, the dynamic password control chip switches to the USB power supply mode and therefore may lose the preset contents. The independent power supplies to the dynamic password control chip and to the USB control chip are realized, no communication between the USB control chip and the dynamic password control chip is required, and the codes amount and the debugging work are reduced.

Persons of ordinary skill in the art may be aware that, the exemplified units and algorithm steps described in the embodiments disclosed herein may be implemented by electronic hardware or a combination of computer software and the electronic hardware. Whether these functions are implemented by hardware or software depends on specific applications and design constraints of the technical solutions. A person skilled in the art may use different methods to implement the described functions for each particular application, but such implementation should not be considered as beyond the scope of the present application.

It can be clearly understood for those skilled in the art that for convenience and concision of the description, the specific operation processes of the above-described systems, apparatuses and units can make reference to the correspondence processes in the above mentioned method embodiments, and are not repeated here.

It should be understood that the systems, apparatuses and methods disclosed in some embodiments provided by the present application can also be realized in other ways. For example, the described apparatus embodiments are merely schematic; for example, the division of the units is merely a division based on logic function, whereas the units can be divided in other ways in actual realization; for example, a plurality of units or components can be grouped or integrated into another system, or some features can be omitted or not executed. Furthermore, the shown or discussed mutual coupling or direct coupling or communication connection can be achieved by indirect coupling or communication connection of some interfaces, apparatuses or units in electric, mechanical or other ways.

The units described as isolated elements can be or not be separated physically; an element shown as a unit can be or not be physical unit, which means that the element can be located in one location or distributed at multiple network units. Some or all of the units can be selected according to actual needs to achieve the purpose of the schemes of the embodiments.

Furthermore, each functional unit in each embodiment of the present application can be integrated into a processing unit, or each unit can exist in isolation, or two or more than two units can be integrated into one unit.

If the integrated unit is achieved in software functional unit and sold or used as an independent product, the integrated unit can be stored in a computer-readable storage medium. Based on this consideration, the substantial part, or the part that is contributed to the prior art of the technical solution of the present application, or part or all of the technical solutions can be embodied in a software product. The computer software product is stored in a storage medium, and includes several instructions configured to enable a computer device (can be a personal computer, device, network device, and so on) to execute all or some of the steps of the method of each embodiment of the present application. The storage medium includes a U disk, a mobile hard disk, a read-only memory (ROM, Read-Only Memory), a random access memory (RAM, Random Access Memory), a disk or a light disk, and other various mediums which can store program codes.

The above embodiments are merely intended to explain the technical solutions of the present application, but not intended for limitation; although detail description has been made to the present application with reference to the above embodiments, those ordinarily skilled in the art should understand that modifications to the technical solutions recited in the embodiments, or equivalent replacements to some of the technical features can still be made; these modifications and replacements do not make the substance of corresponding technical solutions depart from the spirit and scope of the technical solutions of each embodiment of the present application.

What is claimed is:

1. A control system based on dynamic password and USBKEY, wherein the control system comprises a dynamic password control chip, a USB control chip, a USB interface, a battery, and a detection circuit;
    an input terminal of the detection circuit is 43807 connected with the USB interface, a first output terminal of the detection circuit is connected with a state detection terminal of the dynamic password control chip, and the detection circuit is configured to output a detection signal to the dynamic password control chip when it is detected that the USB interface is in connection with an external device;
    the dynamic password control chip is configured to enter a sleep mode when a detection signal is received;
    the battery is connected with a power input terminal of the dynamic password control chip, and the battery is configured to power to the dynamic password control chip; and
    an input/output terminal of the USB control chip is connected with the USB interface, and the USB control chip is configured to interactively communicate with the external device via the USB interface;
    the control system further comprises a keyboard circuit;
    the keyboard circuit comprises multiple keys, multiple first signal lines, and multiple second signal lines; the multiple first signal lines and the multiple second signal lines are crosswisely arranged, each of the multiple keys is connected with one of the multiple first signal lines and one of the multiple second signal lines, the multiple first signal lines and the multiple second signal lines are connected with multiple input terminals of the dynamic password control chip, and at least one of the multiple second signal lines is connected with an input terminal of the USB control chip; and
    a second output terminal of the detection circuit is connected with one of the multiple first signal lines of the keyboard circuit, and the detection circuit is configured to adjust a level state of the one of the multiple first signal lines connected therewith when the USB interface is connected with the external device, allowing the USB control chip to receive key press information from the keyboard.

2. The control system of claim 1, wherein the dynamic password control chip is further configured to scan the keys when it is detected that the USB interface is not connected with the external device, and to enter into the sleep mode when a shutdown signal is received or when a scanning time exceeds a preset value.

3. The control system of claim 2, wherein, the control system further comprises a display, and an output terminal of the dynamic password control chip and an output terminal of the USB control chip are connected with an input terminal of the display;
    the dynamic password control chip is configured to stop control of the display and enter into the sleep mode when it is detected that the USB interface is in connection with the external device; and
    the USB control chip is configured to control the display when the USB interface is in connection with the external device.

4. The control system of claim 1, wherein, the detection circuit comprises a first resistor, a second resistor, and a switch tube;
    a first terminal of the first resistor is connected with a power terminal of the USB interface, a second terminal of the first resistor is connected with a first terminal of the second resistor and a control terminal of the switch tube, a second terminal of the second resistor and an input terminal of the switch tube are in common grounding, and the control terminal of the switch tube acts as the first output terminal of the detection circuit, and an output terminal of the switch tube acts as the second output terminal of the detection circuit.

5. The control system of claim 4, wherein, the control system further comprises a display, and an output terminal of the dynamic password control chip and an output terminal of the USB control chip are connected with an input terminal of the display;

the dynamic password control chip is configured to stop control of the display and enter into the sleep mode when it is detected that the USB interface is in connection with the external device; and the USB control chip is configured to control the display when the USB interface is in connection with the external device.

6. The control system of claim 1, wherein, an isolation circuit is arranged between the USB control chip and the keyboard circuit; the isolation circuit comprises a unidirectional conduction device and a pull-up resistor, an input terminal of the unidirectional conduction device is connected with a first terminal of the pull-up resistor, an output terminal of the unidirectional conduction device forms one output terminal of the isolation circuit, a first terminal of each pull-up resistor is connected with one corresponding input terminal of the USB control chip, and a second terminal of each pull-up resistor is connected with a direct current power supply.

7. The control system of claim 6, wherein, the control system further comprises a display, and an output terminal of the dynamic password control chip and an output terminal of the USB control chip are connected with an input terminal of the display;

the dynamic password control chip is configured to stop control of the display and enter into the sleep mode when it is detected that the USB interface is in connection with the external device; and the USB control chip is configured to control the display when the USB interface is in connection with the external device.

8. The control system of claim 1, wherein, the control system further comprises a display, and an output terminal of the dynamic password control chip and an output terminal of the USB control chip are connected with an input terminal of the display;

the dynamic password control chip is configured to stop control of the display and enter into the sleep mode when it is detected that the USB interface is in connection with the external device; and the USB control chip is configured to control the display when the USB interface is in connection with the external device.

9. The control system of claim 1, wherein, an isolation resistor is arranged between each output terminal of the USB control chip and each input terminal of the display.

10. A control method of a control system based on a dynamic password and USBKEY, wherein the control system comprises a dynamic password control chip, a USB control chip, a USB interface, a battery, and a detection circuit;

an input terminal of the detection circuit is connected with the USB interface, a first output terminal of the detection circuit is connected with a state detection terminal of the dynamic password control chip, and the detection circuit is configured to output a detection signal to the dynamic password control chip when it is detected that the USB interface is in connection with an external device;

the dynamic password control chip is configured to enter a sleep mode when a detection signal is received;

the battery is connected with a power input terminal of the dynamic password control chip, and the battery is configured to power to the dynamic password control chip; and an input/output terminal of the USB control chip is connected with the USB interface, and the USB control chip is configured to interactively communicate with the external device via the USB interface;

the control system further comprises a keyboard circuit;

the keyboard circuit comprises multiple keys, multiple first signal lines, and multiple second signal lines; the multiple first signal lines and the multiple second signal lines are crosswisely arranged, each of the multiple keys is connected with one of the multiple first signal lines and one of the multiple second signal lines, the multiple first signal lines and the multiple second signal lines are connected with multiple input terminals of the dynamic password control chip, and at least one of the multiple second signal lines is connected with an input terminal of the USB control chip; and a second output terminal of the detection circuit is connected with one of the multiple first signal lines of the keyboard circuit, and the detection circuit is configured to adjust a level state of the one of the multiple first signal lines connected therewith when the USB interface is connected with the external device, allowing the USB control chip to receive key press information from the keyboard, and the method comprises the following steps:

outputting the detection signal by the detection circuit to the dynamic password control chip when it is detected that the USB interface is in connection with the external device;

allowing the dynamic password control chip to enter into the sleep mode when the detection signal is received;

supplying power by the battery to the dynamic password control chip; and allowing the USB control chip to interactively communicate with the external device via the USB interface.

11. The control method of claim 10, wherein, the control method further comprises the following step:

scanning keys by the dynamic password control chip when it is detected that the USB interface is not connected with the external device, and allowing the dynamic password control chip to enter into the sleep mode when a shutdown signal is received or when a scanning time exceeds a preset value.

12. The control method of claim 10, wherein, the control method further comprises the following steps:

stopping driving the display and entering the sleep mode by the dynamic password control chip when it is detected that the USB interface is in connection with the external device; and controlling the display by the USB control chip when the USB interface is in connection with the external device.

* * * * *